(12) United States Patent
Seo et al.

(10) Patent No.: US 9,509,409 B2
(45) Date of Patent: Nov. 29, 2016

(54) OPTICAL TRANSCEIVER AND OPTICAL COMMUNICATION SYSTEM

(71) Applicant: OE Solutions America, Inc., Englewood Cliffs, NJ (US)

(72) Inventors: Wanseok Seo, Irvine, CA (US); Jong Ho Kim, Irvine, CA (US); Moon Soo Park, Irvine, CA (US); Joon Sang Yu, Yongin-Si (KR)

(73) Assignee: OE Solutions America, Inc., Englewood Cliffs, NJ (US)

( * ) Notice: Subject to any disclaimer, the term of this patent is extended or adjusted under 35 U.S.C. 154(b) by 0 days.

(21) Appl. No.: 14/558,383

(22) Filed: Dec. 2, 2014

(65) Prior Publication Data

US 2015/0200729 A1 Jul. 16, 2015

Related U.S. Application Data

(60) Provisional application No. 61/910,493, filed on Dec. 2, 2013.

(51) Int. Cl.
| | |
|---|---|
| *H04B 10/00* | (2013.01) |
| *H04B 10/40* | (2013.01) |
| *H04J 14/00* | (2006.01) |

(52) U.S. Cl.
CPC ..................... *H04B 10/40* (2013.01)

(58) Field of Classification Search
CPC ............ H04B 10/07957; H04B 10/572
See application file for complete search history.

(56) References Cited

U.S. PATENT DOCUMENTS

| | | | |
|---|---|---|---|
| 5,202,782 A | 4/1993 | Nakamura et al. | |
| 7,127,653 B1 | 10/2006 | Gorshe | |
| 2002/0167697 A1 | 11/2002 | Willebrand | |
| 2004/0179855 A1* | 9/2004 | Harada | H04J 14/02 398/197 |
| 2005/0123300 A1* | 6/2005 | Kim | H04J 14/0226 398/84 |
| 2006/0256875 A1 | 11/2006 | McClellan | |
| 2009/0055871 A1 | 2/2009 | Song et al. | |
| 2011/0135312 A1 | 6/2011 | El-Ahmadi et al. | |
| 2012/0288281 A1 | 11/2012 | Camino, Jr. et al. | |
| 2013/0071108 A1 | 3/2013 | Park et al. | |
| 2013/0170836 A1 | 7/2013 | Lee et al. | |

(Continued)

FOREIGN PATENT DOCUMENTS

KR  10-2007-0013539 A  1/2007

OTHER PUBLICATIONS

International Search Report and Written Opinion mailed Mar. 6, 2015 for corresponding International Application No. PCT/US14/68241.

(Continued)

*Primary Examiner* — Daniel Dobson
(74) *Attorney, Agent, or Firm* — Arent Fox LLP

(57) ABSTRACT

Disclosed is an optical transceiver which includes an optical transmitter converting a first electrical signal into a first optical signal, an optical receiver converting a second optical signal into a second electrical signal, and a processing unit operatively coupled to the optical transmitter and the optical receiver. The processing unit is configured to obtain first wavelength information of the first optical signal and second wavelength information of the second optical signal and compare the first wavelength information and the second wavelength information to control a wavelength separation interval between the first optical signal and the second optical signal.

26 Claims, 10 Drawing Sheets

(56) References Cited

U.S. PATENT DOCUMENTS

2013/0315599 A1 11/2013 Lam et al.
2015/0381276 A1* 12/2015 Saito ................ H04J 14/02
                                                               398/34

OTHER PUBLICATIONS

International Search Report and Written Opinion of PCT/US2014/068204 dated Mar. 3, 2015.

\* cited by examiner

OPTICAL TRANSCEIVER AND OPTICAL COMMUNICATION SYSTEM

CLAIM OF PRIORITY UNDER 35 U.S.C. & 119

This present application for patent claims priority to U.S. Provisional Application No. 61/910,493, titled "OPTICAL TRANSCEIVER," filed Dec. 2, 2013, which is hereby expressly incorporated by reference herein in its entirety.

TECHNICAL FIELD

The present invention relates to a system and methods for controlling a wavelength by exchanging wavelength information between two optical transceivers, and in particular between two optical transceivers using the same wavelength band over a single optical fiber.

BACKGROUND

A digital transmission system using an optical fiber is widely used in a wired communication area. An optical transmission system a time division multiplexing (TDM) scheme has been widely used. The TDM scheme transmits a high-speed signal by time-division multiplexing multiple signals for transferring data including voice data. For example, a representative system using the TDM technology includes a synchronous optical networking (SONET)/synchronous digital hierarchy (SDH) optical transmission system.

As demands for applications requiring advanced features and more data increase, an amount of non-voice data such as video, data, and the like has increased tremendously far exceeding that of regular voice traffic. Accordingly, in recent years, an optical transport network (OTN) type optical transmission system has been introduced and implemented with a high transmission speed, reaching up to a 100 Giga bits per second (Gbps) of bit rate. A basic type of an OTN type optical transmission system includes a TDM type transmission technology.

Alternatively, another type of transmission technology has been gaining popularity with increased data traffic, e.g., a wavelength division multiplexing (WDM) type based technology. The WDM type based technology greatly increases a transmission capacity of the optical communication system. WDM is a technology which multiplexes a number of optical carrier signals onto a single optical fiber by using different wavelengths of laser light. For example, in a WDM based communication system, a wavelength band is divided into multiples of narrow wavelength bands and thereafter, a digital signal may be allocated and transmitted to a wavelength of each the narrow wavelength bands.

The WDM based technology is independent of a transmission speed of the digital signal, and thus has been widely used to construct a hundreds Gbps-grade large-capacity optical transmission system.

FIG. 1 illustrates an example of a general dense wavelength division multiplexing (DWDM) optical transmission network configuration, in which a central office 2 is connected to a core network 1. The central office 2 and respective local offices 3, 4, and 5 (e.g., base stations 3, 4, and 5) are generally arranged to form a ring-type network. The number of the local offices may vary depending on an actual implementation of the system configuration.

Let us assume that the respective base stations 3, 4, and 5 are configured to be connected with one or more remote sites or stations. By way of example, in FIG. 1, the base station 3 is configured to be connected with a remote site 6. FIG. 2 illustrates an example method for allocating a wavelength in configuring a link between the local office 3 and the remote site 6. In this configuration, transmission and reception wavelengths are different from each other and thus respective optical transceivers may perform transmission and reception in different wavelengths. For example, as shown in FIG. 2, the local office 3 includes a plurality of optical transceivers 11, 12, ..., 13 and N (e.g., optical TRX 1, optical TRX2, ..., optical TRX N) and the remote site 6 includes a plurality of optical transceivers 21, 22, ..., and 23 (e.g., optical TRX 1', optical TRX 2', ..., optical TRX N'). In the example, the local office 3 uses a set of transmission wavelengths $\lambda_a, \lambda_b, \ldots,$ and $\lambda_n$, and the remote site 6 may use a second set of transmission wavelengths $\lambda_A, \lambda_B, \ldots,$ and $\lambda_N$ over a single optical fiber 9 (or also used as an optical link herein). As a result, the transmission and reception wavelengths of the respective optical transceivers in the local office 3 or remote site 6 different and may be in different wavelength bands arranged at different positions.

In another implementation, as shown in FIG. 3, both the local office 3 and the remote site 6 may use the same set of transmission wavelengths $\lambda_a, \lambda_b, \ldots,$ and $\lambda_n$. Accordingly, the transmission and reception wavelengths of the optical transceivers 11, 12, and 13 of the local office 3 and the optical transceivers 21, 22, and 23 of the remote site 6 are arranged at the same position, respectively. Such a configuration provides certain advantages, such as the reduced number of wavelengths and the increased number of channels over the single optical fiber 9, compared to the example configuration shown in FIG. 2.

However, in the example implementation shown in FIG. 3, since the wavelengths used in the configuration above between the local office 3 and the remote site 6 may be arranged close to each other (e.g., as in DWDM) noise and inter-wavelength interference may occur, thereby degrading the performance of the optical communication system. Further, a probability of having a transmission error may be increased as the transmission and reception wavelengths are changed due to external factors.

Accordingly, there is a need for an improved method for improving performance of an optical communication system in a DWDM system using a single optical fiber, in which wavelengths of an uplink signal and a downlink signal are close to each other due to the external factors.

SUMMARY

The present disclosure has been made in an effort to provide an optical transceiver and an optical communication system capable of controlling a wavelength by exchanging wavelength information with a remote optical transceiver.

In an aspect, the present disclosure provides an optical transceiver configured to communicate over a single optical line (e.g., an optical fiber). The optical transceiver includes: an optical transmitter, an optical receiver, and a processing unit. The optical transmitter is configured to convert a first electrical signal into a first optical signal. The optical receiver is configured to convert a second optical signal into a second electrical signal. The processing unit is configured to obtain first wavelength information of the first optical signal and second wavelength information of the second optical signal and to compare the first wavelength information of the first optical signal and the second wavelength information of the second optical signal so as to control a wavelength separation interval between the first optical signal and the second optical signal.

In an aspect, the optical transceiver is configured to support a wavelength division multiplexing (WDM) type technology.

In an aspect, the wavelength separation interval is controlled so as to reduce interferences between the wavelength of the first optical signal and the second optical signal.

In another aspect, the optical transceiver communicates with a remote optical transceiver over the single optical line in a first wavelength band, in which the first wavelength band comprises a plurality of sub-bands.

In an aspect, the optical transceiver may further include a transmission unit configured to insert the first wavelength information into the first electrical signal and send the first electrical signal including the first wavelength information to the optical transmitter.

In another aspect, the optical transceiver may further include a reception unit configured to obtain the second wavelength information of a second optical signal from the second electrical signal and send the obtained second wavelength information to the processing unit.

In another aspect, the processing unit may include a comparison unit configured to compare the first wavelength information and the second wavelength information and to determine whether a wavelength separation interval between center wavelengths of the first and second optical signals is at least a predetermined amount. The processing unit further includes a control unit configured to output a wavelength change signal to the optical transmitter based on a determination by the comparison unit.

In another aspect, the control unit may control a center wavelength of the first optical signal so as to satisfy a mathematical expression when the wavelength separation interval between the first and second optical signals is smaller than the predetermined amount:

$$|\lambda_1 - \lambda_2| \geq DIFF$$

where, $\lambda_1$ represents the center wavelength of the first optical signal, $\lambda_2$ represents the center wavelength of the second optical signal, and DIFF represents a minimum wavelength separation spacing for a minimum amount of interferences between the first optical signal and the second optical signal.

In another aspect, the control unit may transmit an error message to the transmission unit when the center wavelength of the optical transmitter is determined to deviate from an allocated sub-band of the first wavelength band, and the transmission unit may insert the error message into the first electrical signal.

In another aspect, the optical transceiver may further include a memory configured to store codes assigned to a plurality of sub-bands the first wavelength band, wherein the control unit may transmit a code corresponding to a center wavelength of the optical transmitter to the transmission unit.

Another example implementation of the present disclosure provides an optical communication system including: a first optical transceiver configured to transmit a first optical signal, a second optical transceiver configured to communicate with the first optical transceiver and transmit a second optical signal to the first optical transceiver, and a single optical line configured to be operatively coupled to the first optical transceiver and the second optical transceiver. The first optical transceiver includes an optical transmitter configured to convert a first electrical signal into a first optical signal to be transmitted to the second optical transceiver via the single optical line, an optical receiver configured to convert a second optical signal received from the second optical transceiver into a second electrical signal. The first optical transceiver further includes a processing unit configured to compare the first wavelength information of the first optical signal and second wavelength information of the second optical signal and control a wavelength separation interval between the first optical signal and the second optical signal.

In an aspect, the first optical transceiver further includes a transmission unit configured to insert the first wavelength information into the first electrical signal and send the first wavelength information to the optical transmitter.

According to exemplary implementations of the present disclosure, a transmission wavelength of an optical signal is controlled by exchanging wavelength information between optical transceivers to reduce interference between an uplink signal and a downlink signal having the same wavelength band comprising a plurality of sub-bands.

DETAILED DESCRIPTION

Figure 1:
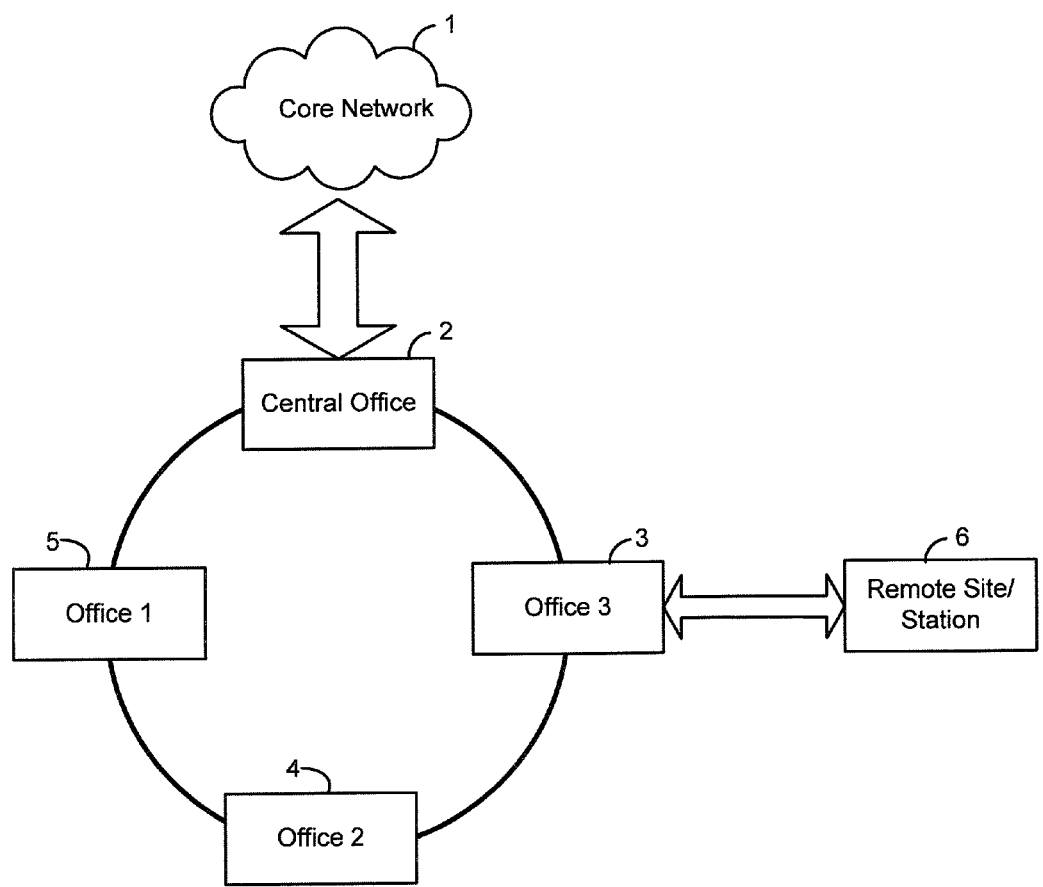
FIG. 1 is an example conceptually illustrating a general dense wavelength division multiplexing (DWDM) optical transmission network configuration.
Figure 2:
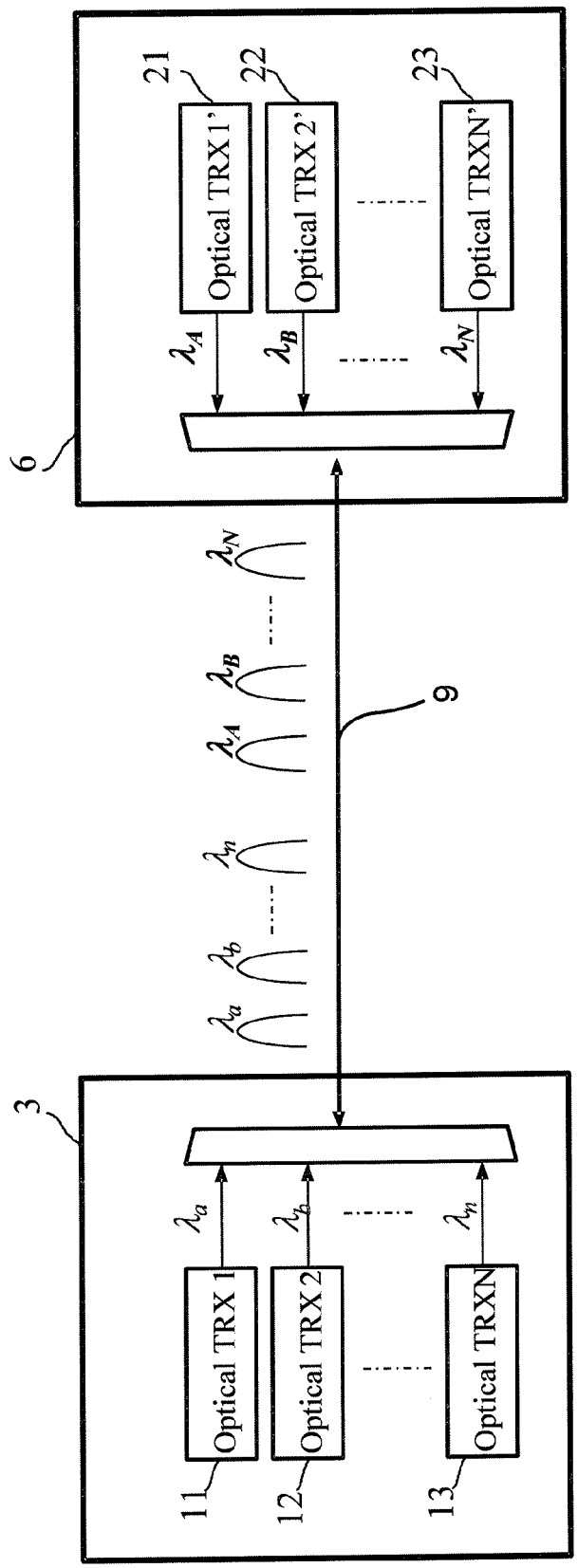
FIG. 2 is a diagram conceptually illustrating an example method for allocating a wavelength in a wavelength division multiplexing transmission system.
Figure 3:
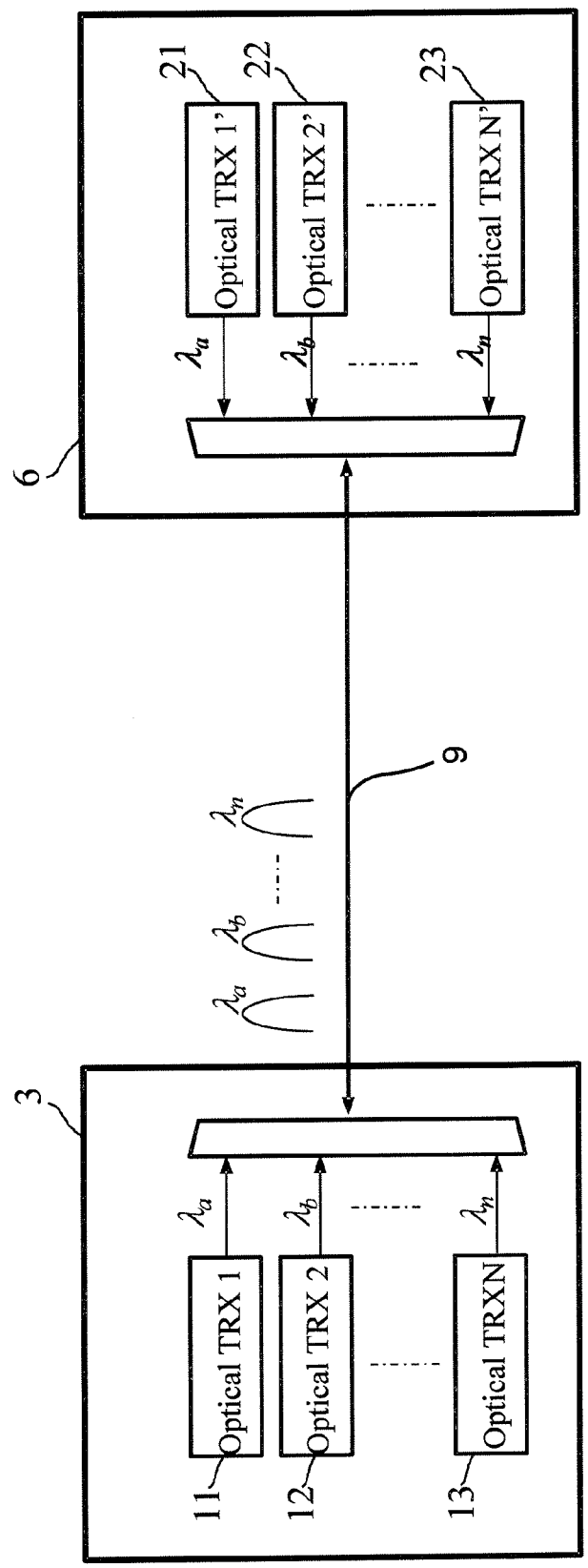
FIG. 3 is a diagram conceptually illustrating an example method for allocating a wavelength in a wavelength division multiplexing transmission system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts of the present disclosure. However, it will be apparent to those skilled in the art that these concepts may be practiced without these specific details. In some instances, to avoid obscuring such concepts, well known structures and components are shown in block diagram form.

The present disclosure may have various modifications and various exemplary implementations. However, this does not limit the present disclosure to specific exemplary implementations, and it should be understood that the present disclosure covers all the modifications, equivalents and replacements within the idea and technical scope of the present disclosure.

Terms including an ordinal number such as "first" or "second" may be used to describe various components, but the components are not limited by the above terms. The above terms are used only to discriminate one component from the other component. For example, without departing from the scope of the present disclosure, a second component may be referred to as a first component, and similarly, the first component may be referred to as the second component. A terminology such as "and/or" includes a combination of a plurality of associated items or any item of the plurality of associated items.

It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, it is understood that no element is present between the element and the other element.

Terms used in the present application are used only to describe specific exemplary embodiments, and are not intended to limit the present disclosure. A singular form may include a plural form if there is no clearly opposite meaning in the context. In the present disclosure, it should be understood that term "include" or "have" indicates that a feature, a number, a step, an operation, a component, a part or the combination thereof described herein is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. It should be understood that terms defined in a generally used dictionary have the same meanings as contextual meanings of associated techniques and if not apparently defined in this application, the terms should not be interpreted as ideological or excessively formal meaning.

Hereinafter, exemplary embodiments of the present disclosure will be described in detail with reference to the accompanying drawings, in which like reference numerals refer to like or similar elements regardless of reference numerals and a duplicated description thereof will be omitted.

Figure 4:
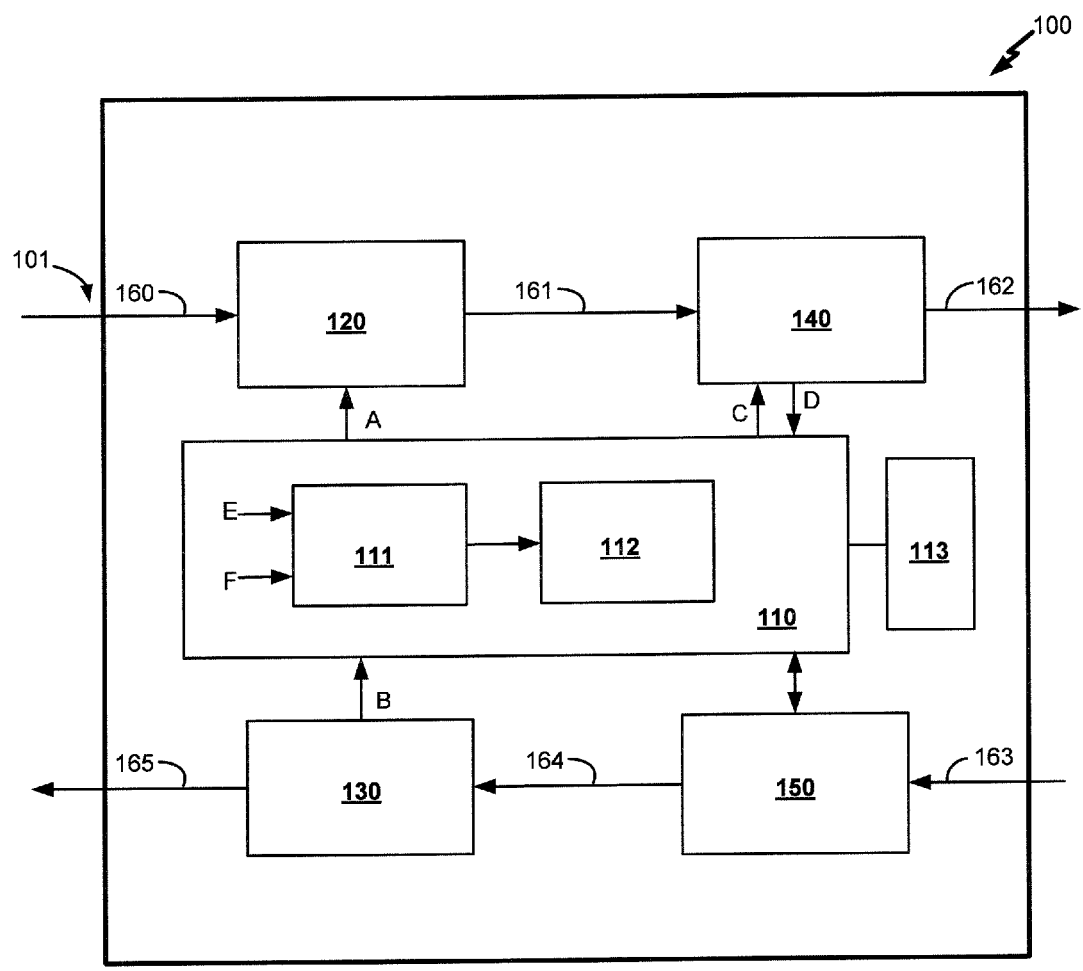
FIG. 4 is a diagram conceptually illustrating an example optical transceiver in accordance with an aspect of the present disclosure.
Figure 5A:
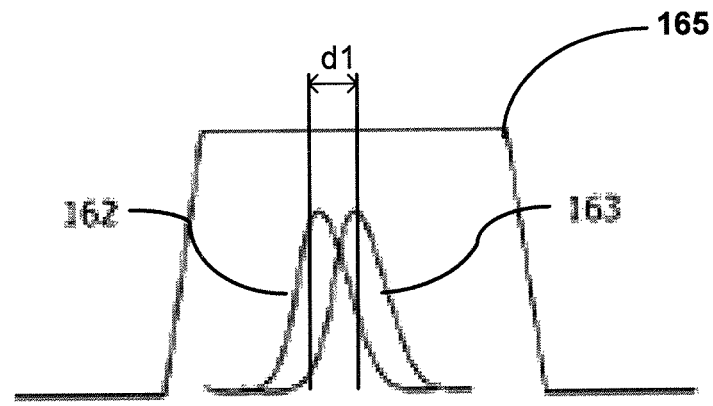
FIGS. 5A and 5B are diagrams conceptually illustrating a process in which wavelengths of a first optical signal and a second optical signal are controlled by the optical transceiver in accordance with an aspect of the present disclosure.
Figure 5B:
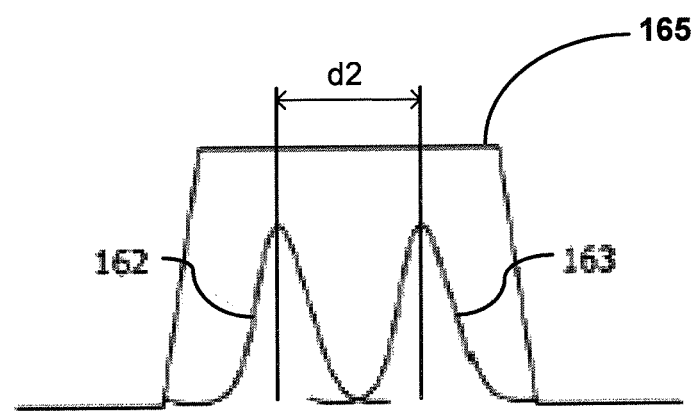

FIG. 4 is a diagram conceptually illustrating an example optical transceiver in accordance with an aspect of the present disclosure. FIGS. 5A and 5B are diagrams conceptually illustrating a process in which wavelengths of a first optical signal and a second optical signal are controlled by the optical transceiver in accordance with an aspect of the present disclosure.

Referring to FIG. 4, the optical transceiver 100 according to the present disclosure includes a transmission unit 120, an optical transmitter 140, an optical receiver 150, a reception unit 130, and a processing unit 110. The optical transceiver 100 may be a small form factor pluggable (SFP) type, but is not particularly limited thereto and may be implemented in various types of optical transceivers in accordance with a Multiple Source Agreement (MSA).

The transmission unit 120 is configured to receive a first electrical signal 161 and output to the optical transmitter 140. The optical transmitter 140 is configured to convert the first electrical signal 161 into a first optical signal 162 and transmit the first optical signal 162 to the outside. The optical receiver 150 is configured to receive a second optical signal 163 from the outside and convert the received second optical signal 163 into an electrical signal 164, which is input to the reception unit 130. In this case, the first optical signal 162 and the second optical signal 163 are transmitted through a single optical line (or optical fiber) and have the same wavelength band, also interchangeably used herein as a first wavelength band. In an aspect, the same wavelength band used herein may be a wavelength band allocated to each optical transceiver in a wavelength division multiplexing (WDM) system. As one example, in a 10 Giga bits per second (Gbps) dense wavelength division multiplexing (DWDM) system, one wavelength band may be allocated as 0.8 nm in wavelength width and a center wavelength of the first optical signal 162 and a center wavelength of the second optical signal 163 may be positioned within a range of 0.8 nm, e.g., within the one wavelength band.

The transmission unit 120 is further configured to receive a data input signal 160 by a host device via an electrical interface 101 (e.g., an electrical connector), insert or add first wavelength information (A) of a wavelength (or a transmission wavelength) of the first optical signal 162 into the data signal 160, outputting as the first electrical signal 161 (also expressed herein as the first wavelength information (A) being inserted or added into the first electrical signal 161), and send the first electrical signal 161 including the first wavelength information (A) to the optical transmitter 140.

The reception unit 130 is configured to obtain or extract second wavelength information from the second electrical signal 164 received from the optical receiver 150 and send the obtained second wavelength information (B) to the processing unit 110, and send the data signal to 165 the host.

The processing unit 110 includes a comparison unit 111 and a control unit 112. The control unit 112 may extract the first wavelength information from the optical transmitter 140 and send the extracted first wavelength information to the transmission unit 120. The processing unit 110 is operatively coupled to various elements of the optical transceiver 100, such as the first optical transmitter 140 and the optical receiver 150. The processing unit 110 is configured to obtain the first wavelength information of the first optical signal 162 and the second wavelength information of the second optical signal 163 and to compare the first wavelength information of the first optical signal 162 and the second wavelength information of the second optical signal 163 so as to control the wavelengths of the first optical signal 162 and/or the second optical signal 163. That is, the wavelengths of the first optical signal 162 and the second optical signal 163 may be adjusted and/or changed wavelength information can be transmitted to the outside (e.g., a remote optical transceiver communicating with the optical transceiver 100).

The comparison unit 111 of the processing unit 110 is configured to compare a wavelength separation interval based on wavelength information (e.g., the first wavelength information) of the first optical signal 162 and wavelength information (e.g., the second wavelength information) of the second optical signal 163. By way of example, the comparison unit 111 compares the first wavelength information and the second wavelength information to determine whether a difference between a center wavelength of the first optical signal 162 and a center wavelength of the second optical signals 163 satisfies a predetermined amount. The first and second wavelength information may include numerical values representing a center wavelength of the first or second optical signal 162 or 163. Alternatively, the first or second wavelength information may also include a representation of a sub-band associated with the first optical signal 162 or the second optical signal 163 within the allocated wavelength band. Further, the control unit 112 of the processing unit is configured to control the wavelength separation interval between the center wavelength of the first optical signal 162 and the center wavelength of the second optical signal 163 so as to satisfy the predetermined amount.

In an aspect of the present disclosure, the allocated wavelength band information and information on the predetermined amount may be stored in a memory 113 which is coupled to the processing unit 110. In an aspect of the present disclosure, the memory 113 is configured to store representations including codes which are mapped to a plurality of sub-bands in the wavelength band. The control unit 112 also configured to send to the transmitter 140 a code (e.g., C) corresponding to a center wavelength of the first optical transceiver or the second optical transceiver.

As noted above, the wavelength information may not be limited to a wavelength value and it would be appreciated that the wavelength information may include various information (e.g., thermoelectric cooler (TEC) temperature, and the like) for characterizing a wavelength of an optical signal.

The control unit 112 is configured to output a wavelength change signal to the optical transmitter 140 such that the wavelength separation interval can satisfy a defined relation (which is described below), when it is determined that the wavelength separation interval between the center wavelengths of the first and second optical signals 162 and 163 is smaller than the predetermined amount.

Further, a TEC (not illustrated) of the optical transmitter 140 is configured to control a temperature according to the wavelength change signal to control a transmission wavelength of the optical transmitter 140.

When the wavelength separation interval between the center wavelengths of the first and second optical signals 162 and 163 is smaller than the predetermined amount due to external factors, as illustrated in FIG. 5A, signal interferences including interference beat noises, thermal noises, etc. (collectively referred herein as the "signal interferences") may be present, degrading the performance of the optical communications. In such a case, the signal interferences may be removed or reduced by appropriately controlling the wavelength separation interval based on the obtained wavelength information of the first and second optical signals. By way of example, as illustrated in FIG. 5B, by increasing, via the processing unit 110, the wavelength separation interval, e.g., from d1 to d2, between the first and second optical signals 162 and 163 within the same wavelength band 165, the signal interferences due to close spacing of the wavelengths can be reduced.

Further, if the data signal 160 is an Ethernet signal, the transmission unit 120 may generate the first wavelength information as an operations, administration, and management (OAM) packet and insert the generated OAM packet between payloads. As one example, the generated OAM packet may be inserted and transmitted in a section having a small number of traffic. Alternatively, the first wavelength information may be transmitted by using an overhead signal after preparing a separate transmission frame.

According to the present disclosure, since the optical transceiver 100 may actively vary the transmission wavelength, the signal interferences between an uplink signal and a downlink signal may be minimized. Therefore, a function to remotely monitor a wavelength of an optical transceiver to control the wavelength in a system terminal (e.g., a control tower) will be apparent to one skilled in the art and thus the description thereof may be omitted.

In detail, however, the control unit 112 may control the wavelength (e.g., a center wavelength) of the optical transmitter 140 according to Expression (1) given below.

$$|\lambda_1 - \lambda_2| \geq DIFF \qquad \text{[Expression 1]}$$

where, $\lambda_1$ represents the center wavelength of the first optical signal 162, $\lambda_2$ represents the center wavelength of the second optical signal 163, and DIFF represents a minimum wavelength separation spacing between the first optical signal 162 and the second optical signal 163 for a minimum amount of signal interferences between the first optical signal 162 and the second optical signal 163. DIFF may be determined as ½ of the allocated wavelength band, but is not particularly limited thereto and may be appropriately modified based on experimental evaluation results. Alternatively, DIFF may be set at 1/N where N is be determined by considering an allocated wavelength band and a transmission speed of a data signal (e.g., bit rates).

By way of example, in a case of a 10 Gbps DWDM system, since one wavelength band for the 10 Gbps DWDM system can be set to a wavelength width of approximately 0.8 nm, and the wavelength band of any one of a plurality of optical transceivers may be allocated to from 1550.0 nm to 1550.80 nm. In this example, DIFF may be set to 0.4 nm, the center wavelength of the first optical signal 162 may be set to 1550.20 nm, and the center wavelength of the second optical signal 163 may be set to 1550.60 nm in advance. In accordance with the present disclosure, when the center wavelength of the second optical signal 163 is changed to 1550.50 nm due to external factors, the center wavelength of the first optical signal 162 can be changed to 1550.10 nm in accordance with Expression (1) above to minimize the signal interferences. In another implementation, the center wavelength of the first optical signal 162 can be adaptively changed to satisfy the Expression (1).

In some cases, the wavelength of the first optical signal 162, which is changed according to Expression (1), may deviate from the allocated wavelength band. That is, in the above example, if the center wavelength of the first optical signal 162 is changed to 1550.0 nm or less, the signal interferences with a neighboring wavelength band may occur. In such a case, the control unit 112 does not change the wavelength of the first optical signal 162, but rather transmits an error message to the transmission unit 120 to inform the remote optical transceiver of the error message that the changed wavelength of the optical transmitter 140 will deviate from the allocated wavelength band. The transmission unit 120 inserts the error message into the data input signal 160 and output the first electrical signal 161 including the error message for transmission to the counterpart, remote optical transceiver.

When the counterpart, remote optical transceiver receives the error message, the counterpart, remote optical transceiver may change its own transmission wavelength, e.g., a center wavelength of the second optical signal 163, according to Expression (1) above and transmit wavelength information on the changed transmission wavelength. Further, a threshold value may be determined by an experiment as the case where the wavelength deviates from the wavelength band.

Alternatively, in multiple sub-band cases, when the selected wavelength of the first optical signal lies on the last or the first sub-band, which means the selected wavelength of the first optical signal is positioned at the edges of the wavelength band, the first optical wavelength is not changed to ensure the minimum wavelength separation interval or spacing. In those cases, the optical transceiver generates and sends an error message to the counterpart, remote optical transceiver, and then the counterpart, remote optical transceiver selects another sub-band for confirming the wavelength separations spacing.

Further, the present disclosure is not particularly limited to changing the wavelength of either the first optical signal 162 or the second optical signal 163, and both a pair of optical transceivers which communicate with each other may change their wavelengths in accordance with Expression (1). As one example, the wavelength of the first optical signal 162 may be set to 1550.20 nm and the wavelength of the second optical signal 163 may be set to 1550.60 nm, but when the wavelength of the first optical signal 162 is changed to 1550.30 nm and the wavelength of the second optical signal 163 is changed to 1550.50 nm, the wavelengths of the respective optical signals may be changed to predetermined wavelengths, respectively.

Figure 6:
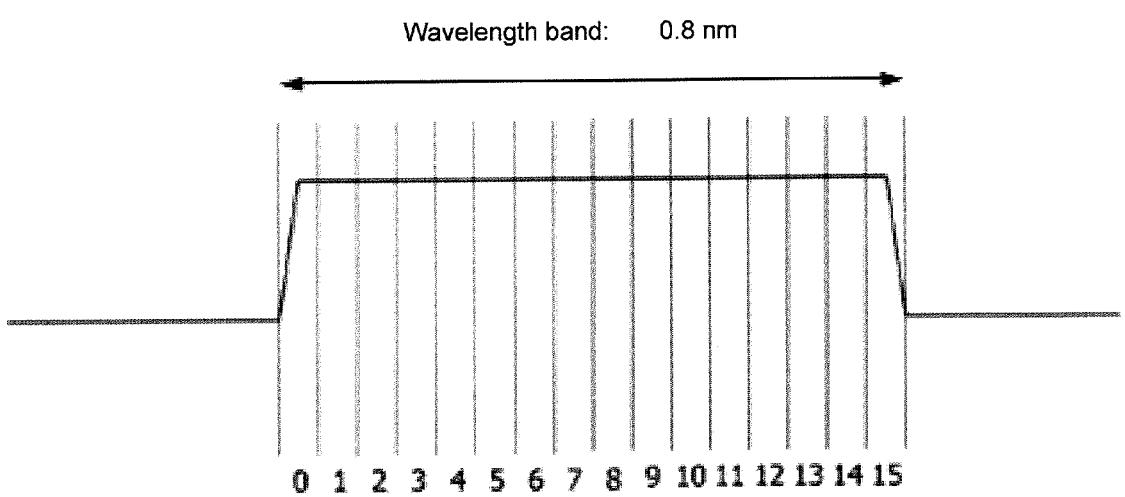
FIG. 6 is a diagram conceptually illustrating allocation of a code value by dividing a wavelength band into a plurality of sub-bands in accordance with an aspect of the present disclosure.
Figure 7:
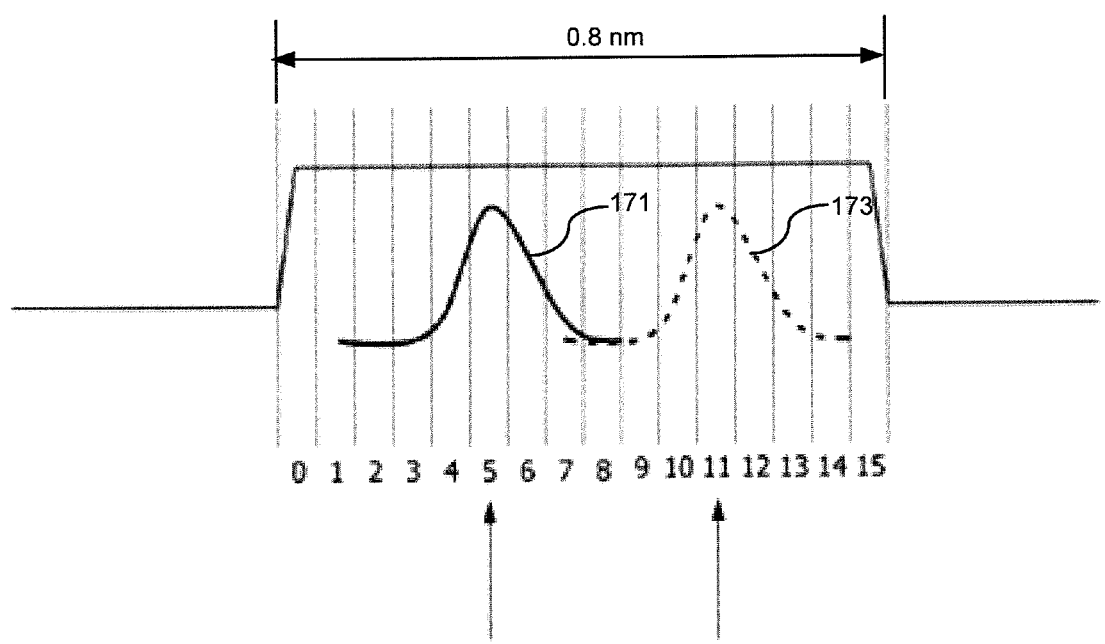
FIG. 7 is a diagram conceptually describing optical positions of the first and second optical signals when the wavelength band is divided into the plurality of sub-bands according to FIG. 6.

FIG. 6 is a diagram conceptually illustrating allocation of a code value by dividing a wavelength band into a plurality of sub-bands in accordance with an aspect of the present disclosure. FIG. 7 is a diagram conceptually illustrating optical positions of the first and second optical signals when the wavelength band is divided into the plurality of sub-bands according to FIG. 6.

Since the wavelength information is data to be transmitted to a counterpart optical transceiver, efficient transmission of data can be done in various ways. In an aspect of the present disclosure, the first wavelength information identifies a first sub-band of the plurality of sub-bands in the wavelength band, and the first sub-band is associated with the first optical signal. That is, the first sub-band is assigned to the first optical signal for transmission purposes. Further, the second wavelength information identifies a second sub-band of the plurality of sub-bands in the wavelength band, and the second sub-band is associated with the second optical signal. That is, the second sub-band is assigned to the second optical signal for transmission purposes. In one implementation, if a wavelength value is 1550.10 nm, at least two bytes or more should be transferred in order to transmit both an integer part and a decimal part of the wavelength value. Therefore, when the wavelength information is converted into information which is smaller than the wavelength value to minimize a package size, a transmission capacity may be reduced. As one example, the allocated wavelength band may be divided into a plurality of sub-bands and a code value may be assigned to each sub-band for transmission.

In an aspect, as shown in FIG. 5, one wavelength band (e.g., 0.8 nm) can be divided into a plurality of sub-bands (e.g., 16 sub-bands or divisions each occupying 0.05 nm) and integer values from 0 to 15 can be sequentially assigned to the 16 sub-bands. It is noted that the plurality of sub-bands is not limited to 16 divisions and the number of sub-bands may be determined at the time of configuring a particular system. In the case of 16 sub-bands, since the wavelength information may be verified by only 4 bits, the packet size can be reduced. Specifically, the following bit pattern can be assigned to the plurality of sub-bands: 0000 (bit pattern) for 0 (sub-band number), 0001 for 1, 0010 for 2, 0011 for 3, 0100 for 4, 0101 for 5, 0110 for 6, 0111 for 7, 1000 for 8, 1001 for 9, 1010 for 10, 1011 for 11, 1100 for 12, 1101 for 13, 1110 for 14, and for 1111 for 15.

In the case of the 10 Gbps DWDM system, since the width of one wavelength band is approximately 0.8 nm, an interval among 16 respective sub-bands becomes 0.05 nm, as noted above. When it is assumed that a width of each sub-band is approximately 0.05 nm, optimal positions of two transmission wavelengths may be determined as follows.

When two optical signals are simultaneously transmitted by using the same wavelength band, the optimal positions may be the positions at which the optical signals are separated from the center of the corresponding wavelength band by DIFF/2 when a minimum wavelength separation interval of the two wavelengths is set to the DIFF. Here, an optimal position represents a position in which the inter-wavelength interferences or signal interferences are minimized, and as a result, a transmission error is reduced when communication is performed by using two transmission wavelengths in the same wavelength band.

When an effective width of the wavelength band is represented by WIDTH and the number of sub-bands is represented by NUM, a wavelength width per sub-band becomes WIDTH/NUM. Further, a center position of the corresponding wavelength band becomes NUM/2. Accordingly, an optimal position, $N_{opt}$, of the first optical signal 162 and an optimal position $P_{opt}$ of the second optical signal 163 described below may be determined by Expressions (2) and (3) given below.

$$Nopt = \frac{NUM}{2} - \frac{DIFF}{a}, \quad \text{[Expression 2]}$$

$$Popt = \frac{NUM}{2} + \frac{DIFF}{a} \quad \text{[Expression 3]}$$

where, a satisfies 1≤a≤4. Preferably, a may be 2.

If NUM=16 and DIFF=6, it can be seen that the optimal positions of two wavelengths are 5 and 11, respectively, as shown in FIG. 7. When the wavelength information is processed as a simple integer as described above, the comparison becomes easier than carrying out calculation using actual wavelength values.

Since the minimum wavelength separation interval, DIFF, between two wavelengths (or center wavelengths of the first optical signal and the second optical signal) and the number of sub-bands, NUM, are previously determined during actual operation, the positions of two wavelengths may be adjusted by using the values. As one example, let's assume that NUM is set to 16 and DIFF is set to 6, in the case where the two wavelengths 171, 173 are positioned at 5 and 11, respectively, as shown in FIG. 7, through the initialization process and thereafter. Now, assume that due to some reason a change of the wavelength occurs, that is, the wavelength 171 positioned at 5 moves to 7, and then the actual wavelength separation interval of the two wavelengths decreases from 6 (which is an initial value) to 4 (e.g., 11−7=4). In the example, since DIFF=6 may be maintained, the wavelength 173 positioned at 11 moves to 13, thereby enabling error free transmission.

In the present disclosure, the method for converting the wavelength information into an integer and processing the converted integer has been described as one example. Information on the wavelength separation intervals may be encoded in various forms and compared with each other by various other methods. Other information such as a TEC temperature value, and the like can be used to estimate the wavelength information and based on the other information, the wavelength separation interval can be considered to determine an optimal wavelength position.

Figure 8:
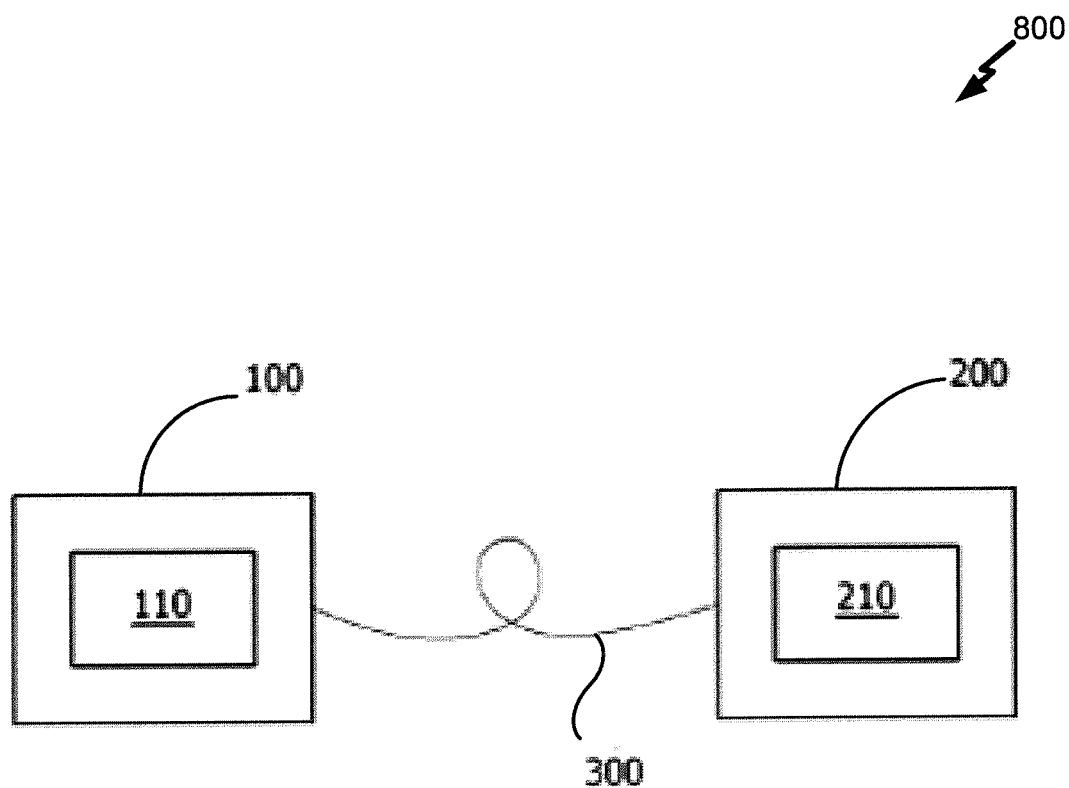
FIG. 8 is a diagram conceptually illustrating an optical communication system in accordance with an aspect of the present disclosure.

FIG. 8 is a diagram conceptually illustrating an optical communication system in accordance with an aspect of the present disclosure. As shown in FIG. 7, the optical communication system 800 in an aspect of the present disclosure includes a first optical transceiver 100 and the second optical transceiver 200, and a single optical line 300 connected therebetween. The first and second optical transceivers 100, 200 include processing units 110 and 210, respectively. Since the first optical transceiver 100 and the second optical transceiver 200 have the substantially similar configuration, a detailed description thereof will be omitted.

The first optical transceiver 100 and the second optical transceiver 200 may insert their own wavelength information into an idle section and transmit the wavelength information. Accordingly, each of the first optical transceiver 100 and the second optical transceiver 100 may compare the wavelength information of the other counterpart optical transceiver and its own wavelength information.

When the wavelength information is to be changed, each of the optical transceivers 100 and 200 may vary its own wavelength in accordance with Expressions 1 to 3 as described above. In the case of the wavelength change, an optical transceiver between the first optical transceiver 100 and the second optical transceiver 200, which recognizes that an interval from the wavelength of the counterpart may first change the own wavelength information.

The optical transceiver that recognizes that the wavelength of the counterpart optical transceiver is changed may transmit an error message to the counterpart optical transceiver, instead of changing the own wavelength. In this case, the counterpart optical transceiver may control its wavelength by controlling the TEC of the optical transmitter of the counterpart optical transceiver. However, when the counterpart optical transceiver repeatedly transmits the optical signal having the same wavelength despite the error message, the counterpart optical transceiver may change its own wavelength.

Figure 9:
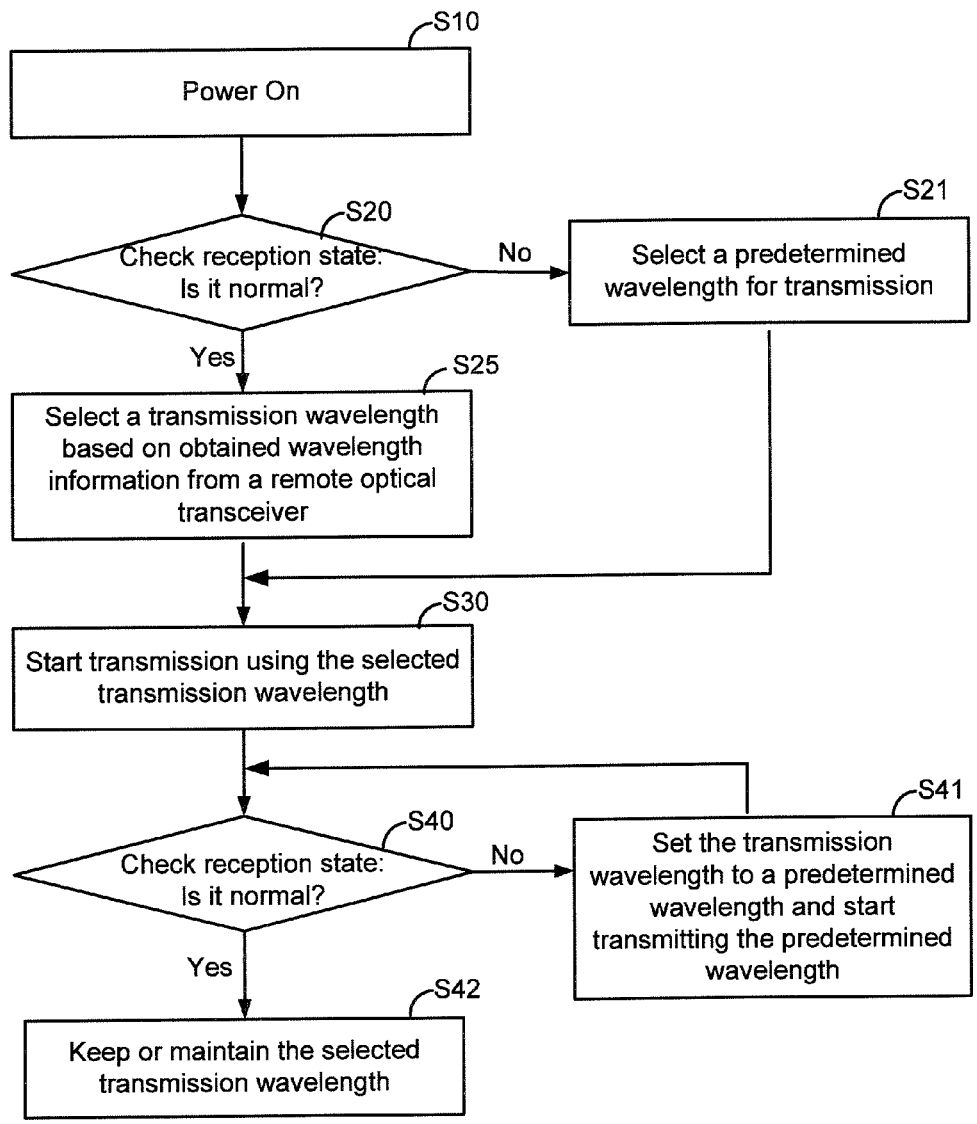
FIG. 9 is a flowchart of an example optical communication method in accordance with an aspect of the present disclosure.
Figure 10:
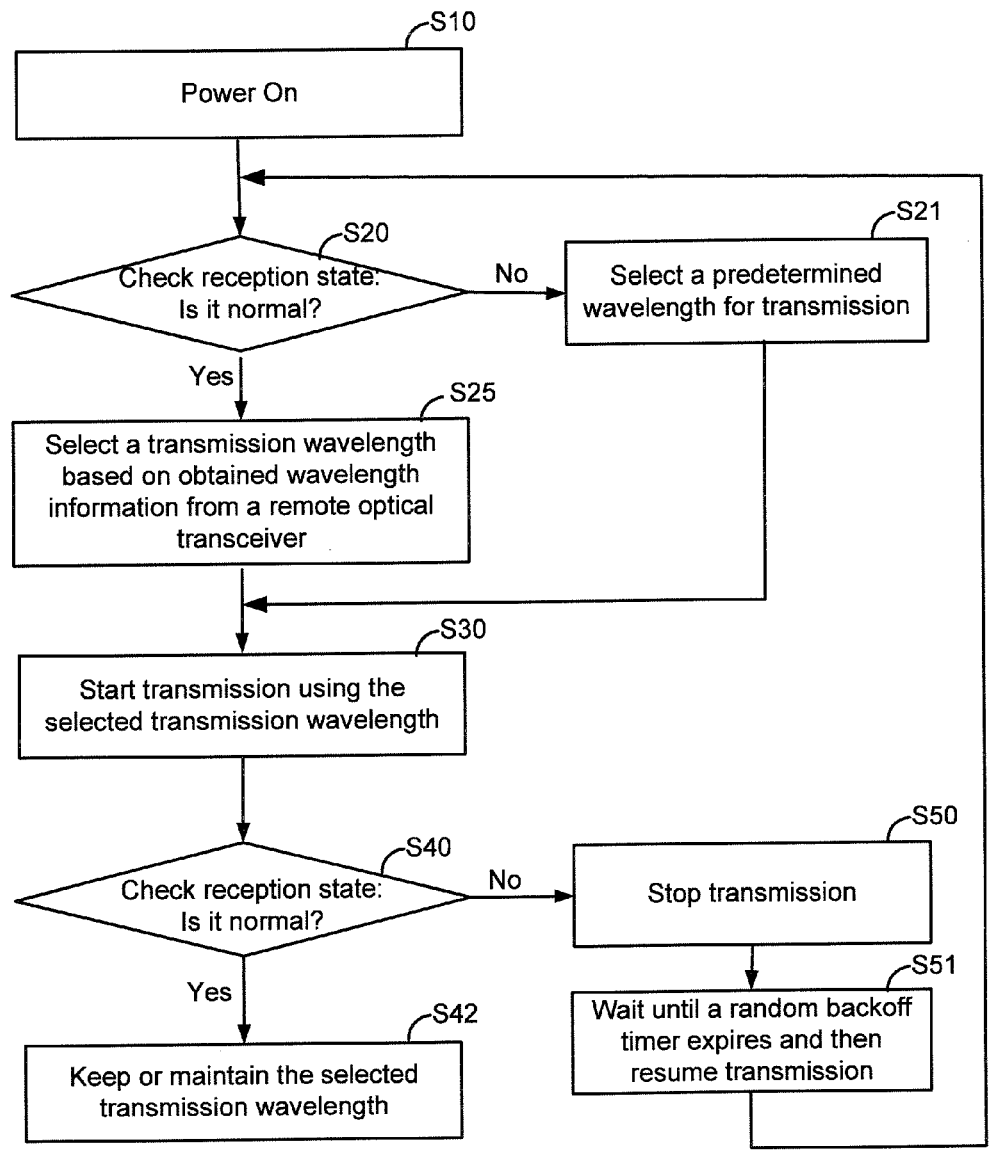
FIG. 10 is a flowchart of an example optical communication method in accordance with an aspect of the present disclosure.

FIG. 9 is a flowchart of an example optical communication method in accordance with an aspect of the present disclosure. FIG. 10 is a flowchart of an example optical communication method in accordance with another aspect of the present disclosure. FIGS. 9 and 10 illustrate example techniques in which the wavelength is varied in an initial communication state when power is applied to the first and second optical transceivers.

As shown in FIG. 9, when the power is applied, at S10, an optical transceiver first verifies its reception state before starting transmission, at S20. That is, the reception state of the optical transceiver is determined and when the reception state is normal, wavelength information transmitted from a counterpart optical transceiver (or a remote optical transceiver) may be acquired to determine a transmission wavelength of the counterpart optical transceiver. At S25, based on the obtained wavelength information of the counterpart optical transceiver, the optical transceiver selects a transmission wavelength, in accordance with the methodology described above. At S30, the optical transceiver starts transmission using the selected transmission wavelength.

Alternatively, the optical transceiver may determine its own transmission wavelength in a wavelength band allocated by using the following Expression (4):

$$|\lambda_{initial} - \lambda_2| \geq DIFF \qquad \text{[Expression 4]}$$

where, $\lambda_{initial}$ represents an initial center wavelength of a first optical signal, $\lambda_2$ represents a center wavelength of a received second optical signal, and DIFF represents a minimum wavelength interval in which signal interferences between the first optical signal and the second optical signal do not occur. DIFF may be determined as ½ of the allocated wavelength band, but is not particularly limited thereto and may be appropriately modified to any value based on experimental evaluation results.

Meanwhile, when failure occurs in the reception state after applying initial power on, at S20, since the wavelength information transmitted from the counterpart optical transceiver may not be obtained, the optical transceiver may select a predetermined wavelength for starting the transmission, at S21.

Thereafter, after a predetermined time elapses, the reception state of the optical transceiver is again verified to determine whether the reception state is normal, at S40. Since the transmission wavelength of the counterpart optical transceiver and the transmission wavelength of the optical transceiver may be at the substantially same position when a failure occurs (e.g., the reception state is not normal), the optical transceiver changes its own transmission wavelength to a predetermined wavelength again and thereafter, transmits using the predetermined wavelength, at S41.

Further, by repeated operations of the above procedures (S40 and S41), the transmission wavelength of the counterpart optical transceiver and the transmission wavelength of the optical transceiver may be located at different positions, and as a result, after a few repeated process a normal reception state of the optical transceiver may be obtained.

In so doing, the optical transceiver receives its own wavelength information and the wavelength information of the counterpart optical transceiver, in accordance with the methodology described herein, and compares its own wavelength information and the wavelength information of the counterpart optical transceiver by using any of Expressions 1 to 3 described above to select transmission wavelengths of the optical transceiver and/or the counterpart optical transceiver at optimal positions. When the optical transceiver is determined to be in the normal reception state, at S40, the optical transceiver keeps or maintains the selected transmission wavelength of the optical transceiver, at S42.

Alternatively, the optical transceiver (or the first optical transceiver) is configured to arbitrarily select and transmit a transmission wavelength of the first optical transceiver when it is determined that the second optical signal from the counterpart optical transceiver has been received with errors for a predetermined time.

Alternatively, the optical transceiver is configured to change and transmit a different wavelength of the first optical signal at a predetermined interval until the second optical signal from the counterpart optical transceiver is normally received.

Such a wavelength control technique may be applied even between optical transceivers which are in communication with each other. For example, when the wavelength is changed in a communicable range, the wavelength may be varied by using any of Expressions 1 to 3 described above, but when the communication becomes impossible (e.g., due to degradation of quality of the optical communication link, signal interferences, etc.), a predetermined wavelength may be selected and transmitted.

An alternative method for initializing an optical transceiver in accordance with an aspect of the present disclosure is illustrated in FIG. 9. An initial wavelength selection can be done following similar steps as in FIG. 8 (e.g., S10-S30). As shown in FIG. 9, at S40, when the reception state is normal after starting the transmission at S30, the optical transceiver keeps or maintains the transmission wavelength, at S42. Further, the transmission wavelength of the optical transceiver is maintained by performing procedures in accordance with one of Expressions 1 to 3 described above to control the transmission wavelength of the optical transceiver to an optimal position.

However, when the reception state is determined to be in failure, at S40, the optical transceiver stops transmission, at S50. Thereafter, the optical transceiver wait until a random backoff timer (e.g., a randomly selected timer) expires at S51. Upon expiration of the random backoff timer, the optical transceiver resumes transmission and determines whether the reception state of the optical transceiver is normal. That is, the optical transceiver will stay in a stand-by state for a predetermined time and, thereafter, examine the reception state again.

When such a process is repeated, any one of two interconnected optical transceivers 100 will likely perform the transmission and the other one may be in the transmission stop state, and as a result, the optical transceiver 100 that is in the transmission stop state may normally receive the wavelength information of the counterpart optical transceiver. Thereafter, the optical transceiver may select the wavelength based on the information and may resume the transmission.

A dense wavelength division multiplexing (DWDM) scheme has been described for easy description in the present disclosure, but the present disclosure is not limited thereto and it is apparent that the present technology described herein may be similarly applied various types of technologies including wavelength division multiplexing (WDM), coarse WDM (CWDM), time-division multiplexing (TDM), etc.

Various aspects of the present disclosure may be implemented by one or more processors. For example, the transmission unit 120, the optical transceiver 140, the optical receiver 150, the reception unit 130, the processing unit 110, 210, as shown in FIGS. 4 and 8, may be implemented with a bus architecture, which may include a bus and any number of interconnecting buses and bridges. The bus links together various circuits including one or more processors, memories, non-transitory computer-readable medium. The one or more processors are responsible for managing the bus and general processing, including the execution of software stored on the non-transitory computer-readable medium. The software, when executed by the one or more processors, causes the one or more processors to perform the various functions described herein for any particular apparatus. The non-transitory computer readable medium may also be used for storing data that is manipulated by the one or more processors when executing software.

The word "software" used herein shall be construed broadly to mean instructions, instruction sets, code, code segments, program code, programs, subprograms, software modules, applications, software applications, software packages, routines, subroutines, objects, machine-readable codes, executables, threads of execution, procedures, functions, etc. whether referred to as software, firmware, middleware, microcode, hardware description language, or otherwise. The software may reside on a non-transitory computer-readable medium. A non-transitory computer-readable medium includes, by way of example, a magnetic storage device, an optical disk, digital versatile disk, a smart card, a flash memory device, random access memory (RAM), read only memory (ROM), programmable ROM, erasable PROM (EPROM), electrically erasable PROM (EEPROM), a register, a removable disk and any other suitable medium for storing software and/or instructions that may be accessed and read by a processor or computer. Those skilled in the art will recognize how best to implement the described functionality presented throughout this disclosure depending on the particular application and the overall design constraints imposed on the overall system.

The term 'unit' used herein in various exemplary embodiments means software or a hardware component, such as a field-programmable gate array (FPGA), application specific integrated circuit (ASIC), logic array, digital signal processor (DSP), micro-processor, etc. and 'unit' performs predetermined roles. However, 'unit' is not a meaning limited to software or hardware. 'Unit' may be configured to be positioned in an addressable storage medium and configured to regenerate one or more processors. Therefore, as one example, 'unit' includes components such as software components, object oriented software components, class components, and task components, processes, functions, attributes, procedures, subroutines, segments of a program code, drivers, firmware, a microcode, a circuit, data, a database, data structures, tables, arrays, and variables. Functions provided in the components and 'units' may be joined as a smaller number of components and 'units' or further separated into additional components and 'units'. In addition, the components and 'units' may be implemented to regenerate one or more central processing units (CPUs) within a device.

While, for purpose of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

The present disclosure has been described in detail with reference to preferred embodiments thereof. However, it will be appreciated by those skilled in the art that various modifications and changes can be made within the scope without departing from the spirit and the area which are defined in the appended claims and their equivalents.

What is claimed is:

1. An optical transceiver configured to be used in a dense wavelength division multiplexing (DWDM) system, in communication with a remote optical transceiver over a single optical fiber using a wavelength band, the optical transceiver comprising:

an optical transmitter configured to receive a first electrical signal and convert the first electrical signal into a first optical signal that is to be transmitted over the single optical fiber to the remote optical transceiver, the first optical signal having a first center wavelength within the wavelength band;

an optical receiver configured to receive a second optical signal from the remote optical transceiver and convert the second optical signal into a second electrical signal, the second optical signal having a second center wavelength within the wavelength band;

a transmission unit configured to receive a first data signal, insert first wavelength information into the first data signal, and send the first data signal, insert first wavelength information as the first electrical signal to the optical transmitter; and a processing unit operatively coupled to the optical transmitter and the optical receiver, and configured to:
obtain the first wavelength information of the first optical signal and second wavelength information of the second optical signal; and
compare the first wavelength information of the first optical signal and the second wavelength information of the second optical signal so as to control a wavelength separation interval between the first optical signal and the second optical signal within the wavelength band for reducing interferences between the first optical and second optical signals.

2. The optical transceiver of claim 1, wherein the wavelength band comprises a plurality of sub-bands, and the first optical signal and the second optical signal each are associated with one of the plurality of sub-bands.

3. The optical transceiver of claim 2, wherein:
the processing unit is further configured to transmit an error message to the transmission unit, when the second center wavelength of the second optical signal received from the remote optical transceiver is determined to deviate from an allocated sub-band of the wavelength band, the allocated sub-band being associated with the second optical signal, and
the transmission unit is further configured to insert the error message into the first data signal for transmission of the error message to the remote optical transceiver.

4. The optical transceiver of claim 2,
further comprising a memory configured to store codes representing the plurality of sub-bands of the wavelength band, and
wherein the processing unit is further configured to send to the transmission unit a code corresponding to the first center wavelength of the first optical signal.

5. The optical transceiver of claim 1, wherein the first wavelength information comprises information for identifying a first sub-band of the plurality of sub-bands, the first sub-band being associated with a wavelength location of the first optical signal within the wavelength band, and the second wavelength information comprises information for identifying a second sub-band of the plurality of sub-bands, the second sub-band being associated with a wavelength location of the second optical signal within the wavelength band.

6. The optical transceiver of claim 1, further comprising:
a reception unit configured to obtain the second wavelength information from the second electrical signal and send the second wavelength information to the processing unit.

7. The optical transceiver of claim 1, wherein the processing unit is further configured to
determine whether the wavelength separation interval between the first center wavelength of the first optical signal and the second center wavelength of the second optical signal is at least the predetermined value; and
output a wavelength change signal to the optical transmitter or the remote optical transceiver, based on a determination result.

8. The optical transceiver of claim 7, wherein the control unit is further configured to control the first center wavelength of the first optical signal so as to satisfy Expression (1) below:

$$|\lambda_1 - \lambda_2| \geq DIFF \qquad \text{[Expression 1]}$$

where, $\lambda_1$ represents the first center wavelength of the first optical signal, $\lambda_2$ represents the second center wavelength of the second optical signal, and DIFF represents a minimum wavelength separation spacing between the first center wavelength and the second center wavelength for a minimum amount of interferences between the first optical signal and the second optical signal.

9. The optical transceiver of claim 1, wherein the optical transceiver is configured to adaptively change and transmit the first optical signal having a different center wavelength from the first center wavelength at a predetermined interval until the second optical signal is normally received.

10. The optical transceiver of claim 9, wherein the optical transceiver is configured to determine an initial transmission wavelength of the first optical signal according to a transmission wavelength of the second optical signal received from the remote optical transceiver.

11. The optical transceiver of claim 10, wherein the initial transmission wavelength of the first optical signal is controlled to satisfy Expression 4:

$$|\lambda_{initial} - \lambda_2| \geq DIFF \qquad \text{[Expression 4]}$$

where, $\lambda_{initial}$ represents an initial center wavelength of the first optical signal, $\lambda_2$ represents a second center wavelength of the second optical signal, and DIFF represents a minimum wavelength separation interval between the first center wavelength and the second center wavelength for a minimum amount of interferences between the first optical signal and the second optical signal.

12. The optical transceiver of claim 10, wherein the optical transceiver is configured to arbitrarily select and transmit a transmission wavelength of the first optical transceiver when it is determined that the second optical signal has been received with errors for a predetermined time.

13. The optical transceiver of claim 1, wherein a bandwidth of the wavelength band of the DWDM system is substantially about 0.8 nm.

14. An optical communication system configured to support a dense wavelength division multiplexing (DWDM) system over a single optical fiber using a wavelength band, comprising:
a first optical transceiver configured to communicate with a second optical transceiver over the single optical fiber, and configured to transmit a first optical signal to the second optical tranceiver, the first optical signal having a first center wavelength within the wavelength band;
the second optical transceiver configured to communicate with the first optical transceiver and configured to transmit a second optical signal to the first optical transceiver, the second optical signal having a second center wavelength within the wavelength band; and wherein the first optical transceiver comprises:

an optical transmitter configured to receive a first electrical signal and convert the first electrical signal into the first optical signal that is to be transmitted over the single optical fiber to the second optical transceiver;

an optical receiver configured to receive the second optical signal from the second optical transceiver and convert the second optical signal into a second electrical signal; and a transmission unit configured to receive a first data signal, insert first wavelength information into the first data signal, and send the first data signal including the first wavelength information as the first electrical signal to the optical transmitter; and a processing unit operatively coupled to the optical transmitter and the optical receiver, and configured to:
compare the first wavelength information of the first optical signal and second wavelength information of the second optical signal so as to control a wavelength separation interval between the first optical signal and the second optical signal within the wavelength band for reducing interferences between the first optical and second optical signals.

15. The optical communication system of claim 14, wherein the wavelength band comprises a plurality of sub-bands, and the first optical signal and the second optical signal each are associated with one of the plurality of sub-bands.

16. The optical communication system of claim 14, wherein the first wavelength information comprises information for identifying a first sub-band of the plurality of sub-bands, the first sub-band being associated with a wavelength location of the first optical signal within the wavelength band, and the second wavelength information comprises information for identifying a second sub-band of the plurality of sub-bands, the second sub-band being associated with a wavelength location of the second optical signal within the wavelength band.

17. The optical communication system of claim 14, wherein the first optical transceiver further comprises:
a reception unit configured to obtain the second wavelength information from the second electrical signal and send the second wavelength information to the processing unit.

18. The optical communication system of claim 14, wherein the processing unit of the first optical transceiver is further
configured to determine whether the wavelength separation interval is at least a predetermined value; and
output a wavelength change signal to the optical transmitter or the second optical transceiver, based on a determination result.

19. The optical communication system of claim 18, wherein the control unit is further configured to control the first center wavelength of the first optical signal so as to satisfy Expression 2 below:

$$|\lambda_1-\lambda_2| \geq DIFF \qquad \text{[Expression 2]}$$

where, $\lambda_1$ represents the first center wavelength of the first optical signal, $\lambda_2$ represents the second center wavelength of the second optical signal, and DIFF represents a minimum wavelength separation spacing between the first center wavelength and the second center wavelength for a minimum amount of interferences between the first optical signal and the second optical signal.

20. The optical communication system of claim 18, wherein the processing unit of the first optical transceiver is further configured to transmit an error message to the transmission unit of the first optical transceiver, when the second center wavelength of the second optical signal received from the second optical transceiver is determined to deviate from an allocated sub-band of the wavelength band, the allocated sub-band being associated with the second optical signal, and the transmission unit of the first optical transceiver is further configured to insert the error message into the first data signal for transmission of the error message to the remote optical transceiver.

21. The optical communication system of claim 18, wherein:
the first optical transceiver further comprises a memory configured to store codes representing a plurality of sub-bands of the wavelength band, and
the processing unit of the first optical transceiver is configured to transmit to the transmission unit of the first optical transceiver a code corresponding to the first center wavelength of the first optical signal.

22. The optical communication system of claim 14, wherein the first optical transceiver is further configured to determine an initial transmission wavelength of the first optical signal according to a transmission wavelength of the second optical signal received from the second optical transceiver.

23. The optical communication system of claim 22, wherein the initial transmission wavelength of the first optical signal is controlled to satisfy Expression 3:

$$|\lambda_{initial}-\lambda_2| \geq DIFF \qquad \text{[Expression 3]}$$

where, $\lambda_{initial}$ represents an initial center wavelength of the first optical signal, $\lambda_2$ represents a second center wavelength of the second optical signal, and DIFF represents a minimum wavelength separation interval between the first center wavelength and the second center wavelength for a minimum amount of interferences between the first optical signal and the second optical signal.

24. The optical communication system of claim 22, wherein the first optical transceiver is configured to arbitrarily select and transmit a transmission wavelength of the first optical transceiver when it is determined that the second optical signal has been received with errors for a predetermined time.

25. The optical communication system of claim 22, wherein the first optical transceiver is configured to adaptively change and transmit the first optical signal having a different center wavelength from the first center wavelength at a predetermined interval until the second optical signal is normally received.

26. The optical communication system of claim 14, wherein a bandwidth of the wavelength band of the DWDM system is substantially about 0.8 nm.

* * * * *